Nov. 14, 1950　　　S. L. MILLER ET AL　　　2,530,260
TREE PLANTER
Filed May 31, 1946
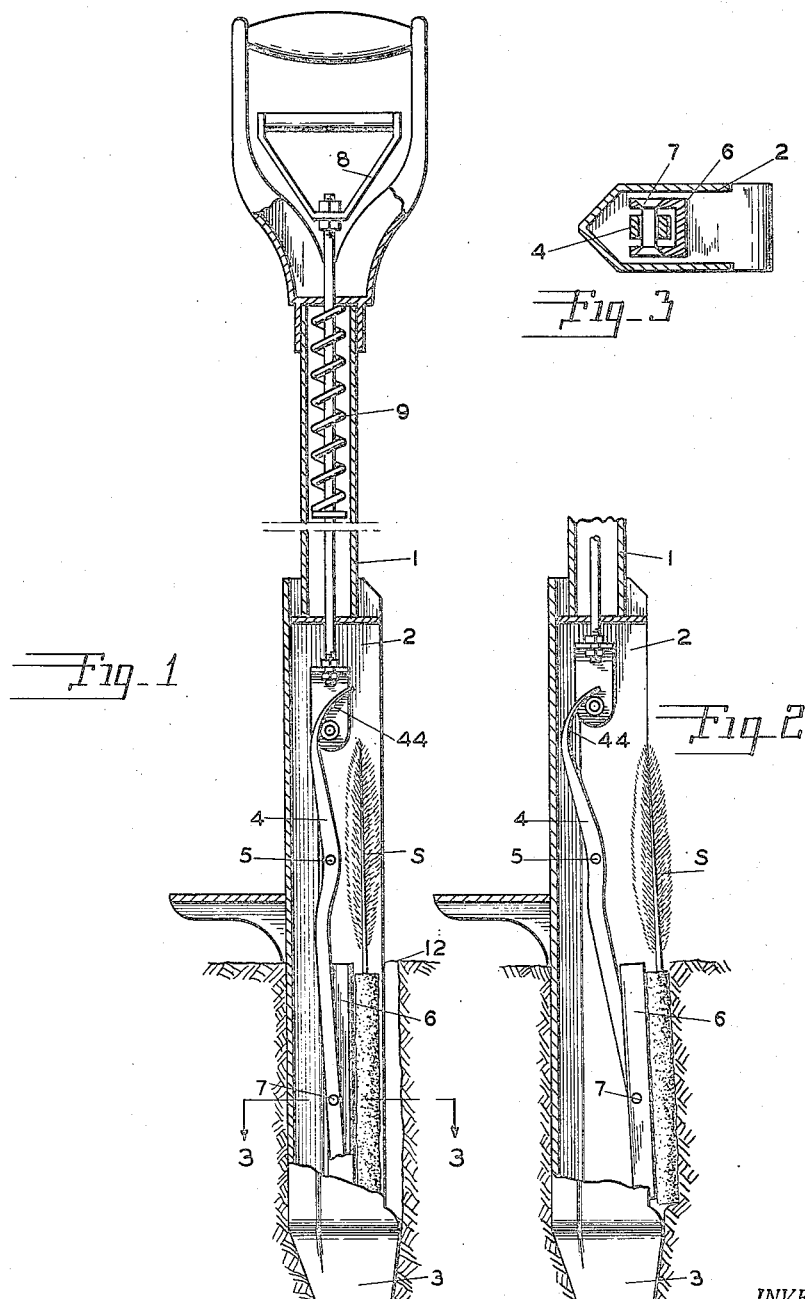
INVENTOR.
SAMUEL L MILLER
LOUIS W. AMORT
BY
ATTORNEY Patented Nov. 14, 1950

2,530,260

UNITED STATES PATENT OFFICE 2,530,260

TREE PLANTER

Samuel L. Miller and Louis W. Amort,
Salem, Oreg.

Application May 31, 1946, Serial No. 673,540

1 Claim. (Cl. 111—4)

This invention relates to an instrument for planting seedling trees.

Reforestation projects require that many thousands of seedling trees be planted in previously unprepared ground from which forests have been removed by logging or sometimes by fire. The terrain being unsuitable for a wheeled vehicle, men, usually in groups, carry seedling trees less than a foot long, wrapped with a small amount of fertilizer, in an open top sack suspended from the shoulder. Before our invention, a hole was struck in the ground by a pick, the seedling inserted and the soil closed around it, all of which made a very laborious occupation out of the job.

It is an object of the invention to substitute a more easily carried and operated instrument that does not require the back bending of the old way and eliminates several other motions, being a much easier tool to use than the pick.

Another object is to provide a planting instrument that punctures the ground with a hole more nearly normal to the surface of the ground than can be expected from a pick in the hands of a laborer.

Briefly, the invention comprises a handled tool pointed or sharpened on its ground penetrating end (the word "pointed" or "point" will be used to also include a sharpened bit), provided with an internal seedling containing chamber above the point and manually operable means for releasing the seedling to the ground after the point has penetrated it for the required distance. The instrument is then withdrawn without damage to the seedling.

We have developed, so far, three types of instruments, all of which satisfy the description supra and all of which fully satisfy the objects stated. These types are illustrated in the following drawings, in which:

Fig. 1 is a longitudinal section of a preferred form of our new instrument shown in ground penetrating position, containing a seedling;

Fig. 2 is the lower part of the same structure, in which a manually operable means has released the seedling tree from the instrument so that the latter may be withdrawn, leaving the seedling in the hole;

Fig. 3 is a section of Fig. 1 on the line 3—3, Fig. 1.

Describing the drawings in greater detail, as shown in Figs. 1 to 3 inclusive. Numeral 1 represents a body of the instrument, as a whole, within which is formed an open sided chamber 2, having a ground penetrating point 3. Within and so mounted in the chamber 2 that room is left for a seedling S, is a lever 4, pivoted at 5, and preferably having a pusher 6 pivoted thereto at 7. The upper end of the lever 4 is formed as a cam portion 44, and when the manually operable handle 8 is pulled up against the spring 9, the lower end of the lever 4, with the pivoted pusher 6, laterally ejects the seedling S from the chamber 2. After penetrating the ground as at 12, the instrument may be moved laterally to enlarge the hole slightly if deemed necessary.

It is recommended that the entire ground penetration portion of the tool be made from metal that is resistant to rust.

Having fully described our instrument, what we claim as new and desire to secure by Letters Patent, is:

A seedling planter comprising a pointed ground penetration portion of generally wedge shape, a plurality of metal walls comprising a seedling chamber integral with and next above said point portion, said seedling chamber normally open on one side to admit a seedling, a handle portion made rigid with the upper part of said seedling chamber, ejector means within said chamber for discharging a seedling after ground penetration is complete, comprising a pivoted lever, a pusher pivoted to said lever, a reciprocal lever operator, and cam and roller means for transmitting motion from the lever operator to the lever.

SAMUEL L. MILLER.
LOUIS W. AMORT.

REFERENCES CITED

The following references are of record in the file of this patent:

UNITED STATES PATENTS

| Number | Name | Date |
|---|---|---|
| 353,070 | Kempe et al. | Nov. 23, 1886 |
| 433,288 | Haupt | July 29, 1890 |
| 905,700 | Hertzfeldt | Dec. 1, 1908 |
| 1,563,625 | Harry | Dec. 1, 1925 |
| 1,771,694 | Talvitie | July 29, 1930 |
| 2,132,308 | McKee | Oct. 4, 1938 |

FOREIGN PATENTS

| Number | Country | Date |
|---|---|---|
| 4923/21 | Australia | Sept. 15, 1922 |
| 550,012 | Germany | May 4, 1932 |